US011205925B2

(12) United States Patent
Takahashi et al.

(10) Patent No.: US 11,205,925 B2
(45) Date of Patent: Dec. 21, 2021

(54) WIRELESS POWER FEEDING STRUCTURE INCLUDING A POWER TRANSMISSION COIL, POWER RECEPTION COIL, AND A CORE OF A MAGNETIC SUBSTANCE

(71) Applicant: HONDA MOTOR CO., LTD., Tokyo (JP)

(72) Inventors: Hiroya Takahashi, Wako (JP); Yoshiaki Kotani, Wako (JP); Takumi Shiiyama, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/931,953

(22) Filed: May 14, 2020

(65) Prior Publication Data
US 2020/0395786 A1 Dec. 17, 2020

(30) Foreign Application Priority Data
Jun. 14, 2019 (JP) .............................. JP2019-111489

(51) Int. Cl.
*H02J 50/00* (2016.01)
*H02J 50/12* (2016.01)
*A01D 69/02* (2006.01)
*G05D 1/02* (2020.01)
*A01D 101/00* (2006.01)

(52) U.S. Cl.
CPC ............ *H02J 50/005* (2020.01); *A01D 69/02* (2013.01); *G05D 1/0259* (2013.01); *H02J 50/12* (2016.02); *A01D 2101/00* (2013.01); *G05D 2201/0208* (2013.01)

(58) Field of Classification Search
CPC .................................. H02J 50/00; H04B 5/00
See application file for complete search history.

(56) References Cited

U.S. PATENT DOCUMENTS

| 5,408,209 A * | 4/1995 | Tanzer ................ F28D 15/0233 336/60 |
| 5,539,296 A * | 7/1996 | Ito ........................... H02J 50/10 320/108 |
| 5,850,135 A * | 12/1998 | Kuki ....................... B60L 50/52 320/108 |

(Continued)

FOREIGN PATENT DOCUMENTS

| EP | 0 552 737 A1 | 7/1993 |
| EP | 2 621 050 A1 | 7/2013 |

(Continued)

OTHER PUBLICATIONS

European Search Report dated Jun. 22, 2020, 8 pages.
European Office Action dated Aug. 3, 2021, English text, 6 pages.

*Primary Examiner* — Adi Amrany
(74) *Attorney, Agent, or Firm* — Rankin, Hill & Clark LLP (57) ABSTRACT

An autonomous running working machine that receives power wirelessly fed from a station includes a power reception coil that is provided in the station and is magnetically coupled to a power transmission coil, in which a core of a magnetic substance is inserted, and the power reception coil includes an open portion through which the core passes when the autonomous running working machine enters the station.

5 Claims, 8 Drawing Sheets

(56) References Cited

U.S. PATENT DOCUMENTS

| | | | | |
|---|---|---|---|---|
| 5,903,134 | A * | 5/1999 | Takeuchi | B60L 53/34 320/108 |
| 6,042,385 | A * | 3/2000 | Watanabe | B60L 53/34 439/38 |
| 6,075,433 | A * | 6/2000 | Ono | H01F 38/14 336/212 |
| 6,127,800 | A * | 10/2000 | Kuki | B60L 53/34 320/108 |
| 9,240,276 | B2 * | 1/2016 | Dynes | B60L 53/126 |
| 9,409,489 | B2 * | 8/2016 | Lee | H02J 7/025 |
| 2011/0148350 | A1 * | 6/2011 | Wegener | H02J 7/025 320/108 |
| 2013/0193915 | A1 * | 8/2013 | Jung | A61C 17/224 320/108 |
| 2013/0205736 | A1 * | 8/2013 | Maruyama | A01D 34/73 56/12.9 |
| 2015/0287527 | A1 * | 10/2015 | Kasar | H02J 50/90 307/104 |
| 2016/0278287 | A1 * | 9/2016 | Kasai | A01D 34/736 |
| 2017/0181375 | A1 * | 6/2017 | Hashimoto | A01D 34/81 |
| 2018/0271014 | A1 * | 9/2018 | Matsuzawa | A01D 34/008 |

FOREIGN PATENT DOCUMENTS

| | | |
|---|---|---|
| JP | H09-102429 | 4/1997 |
| JP | 2012-055096 | 3/2012 |
| JP | 2016-010382 | 1/2016 |
| JP | 2017-010161 | 1/2017 |
| WO | 2018/171658 A1 | 9/2018 |

* cited by examiner

WIRELESS POWER FEEDING STRUCTURE INCLUDING A POWER TRANSMISSION COIL, POWER RECEPTION COIL, AND A CORE OF A MAGNETIC SUBSTANCE

INCORPORATION BY REFERENCE

The present application claims priority under 35 U.S.C. § 119 to Japanese Patent Application No. 2019-111489 filed on Jun. 14, 2019. The content of the application is incorporated herein by reference in its entirety.

BACKGROUND OF THE INVENTION

Field of the Invention

The present invention relates to an autonomous running working machine and a wireless power feeding system.

Description of the Related Art

A lawn mower which runs autonomously in a lawn region and mows a lawn is known as one of autonomous running working machines which work while running autonomously. The lawn mower of this type includes an electric motor as a power source and a battery which feeds power to the electric motor, and the battery is charged when the lawn mower is connected to a station (see, for example, Japanese Patent Laid-Open No. 2017-10161).

An electromagnetically guided wireless power feeding system is known as one of non-contact power feeding systems which feed power to a battery in a non-contact manner. The wireless power feeding system uses a method of inserting a core of a magnetic substance into a power transmission coil and a power reception coil in order to enhance the efficiency of energy transfer between the power transmission coil and the power reception coil (see, for example, Japanese Patent Laid-Open No. 2012-55096).

SUMMARY OF THE INVENTION

A wireless power feeding system can be applied to a lawn mower and a station by providing the lawn mower with a power reception coil and providing the station with a power transmission coil and a core of a magnetic substance.

However, if the power reception coil is not arranged at an appropriate position with respect to the core when the lawn mower is located at the station, the efficiency of energy transfer of wireless power feeding declines.

An aspect of the present invention has an object to provide an autonomous running working machine and a wireless power feeding system that allow easy arrangement of a power reception coil at an appropriate position with respect to a core.

According to an aspect of the present invention, there is provided an autonomous running working machine that receives power wirelessly fed from a station, including a power reception coil that is magnetically coupled to a power transmission coil into which a core of a magnetic substance is inserted, the power transmission coil being provided in the station, wherein the power reception coil includes an open portion through which the core passes when the autonomous running working machine enters the station.

According to an aspect of the present invention, in the autonomous running working machine, the power reception coil has a front end portion that faces the core when the autonomous running working machine enters the station, the front end portion being arranged at a position higher than a leading end of the core to form the open portion below the front end portion.

According to an aspect of the present invention, in the autonomous running working machine, the power reception coil includes a low-position portion that is arranged at a position lower than the leading end of the core.

According to an aspect of the present invention, in the autonomous running working machine, the low-position portion is provided within a range including a rear end portion that is opposed to the front end portion or between the rear end portion and the front end portion.

According to an aspect of the present invention, in the autonomous running working machine, a power transmission cover that covers the power transmission coil is provided in the station, and the autonomous running working machine includes an engagement portion that engages with the power transmission cover when the autonomous running working machine enters the station.

According to an aspect of the present invention, in the autonomous running working machine, the power transmission cover includes a convex projecting portion that stores the core, the engagement portion includes a recessed portion that engages with the projecting portion, and the power reception coil is provided so as to surround the recessed portion.

According to an aspect of the present invention, there is provided a wireless power feeding system including a station and an autonomous running working machine that receives power wirelessly fed from the station, wherein the station includes a power transmission coil and a core, of a magnetic substance, into which the power transmission coil is inserted, the autonomous running working machine includes a power reception coil that is magnetically coupled to the power transmission coil, and the power reception coil includes an open portion through which the core passes when the autonomous running working machine enters the station.

The aspects of the present invention allow easy arrangement of a power reception coil at an appropriate position with respect to a core.

DETAILED DESCRIPTION OF THE PREFERRED EMBODIMENT

An embodiment of the present invention will be described below with reference to the drawings.

Figure 1:
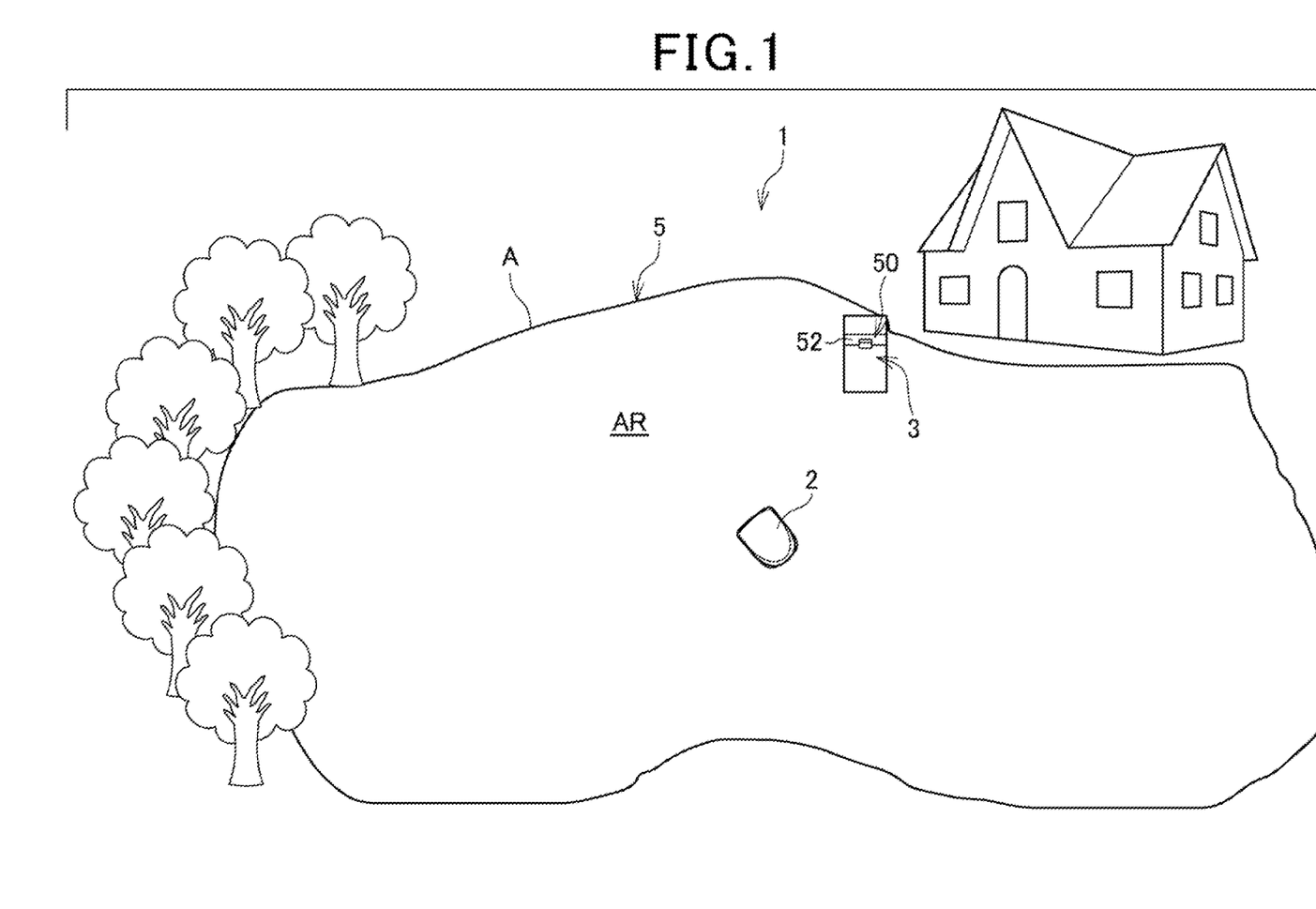
FIG. 1 is a view showing a configuration of an unmanned lawn-mowing system according to an embodiment of the present invention.

FIG. 1 is a view showing a configuration of an unmanned lawn-mowing system 1 according to the present embodiment.

The unmanned lawn-mowing system 1 includes a robot lawn mower 2, an area wire 5 which demarcates a lawn-mowing area AR as a working target area where lawn-mowing work is to be executed, and a charging station 3.

The robot lawn mower 2 is an autonomous running working machine which mows turf glass while running autonomously in the lawn-mowing area AR without human intervention. The area wire 5 is a member which is laid along a boundary A by a business operator or the like such that the robot lawn mower 2 can sense the boundary A of the lawn-mowing area AR. In the present embodiment, the laid area wire 5 is magnetic, and the robot lawn mower 2 senses the boundary A of the lawn-mowing area AR by detecting magnetism of the area wire 5. The robot lawn mower 2 corresponds to one example of an "autonomous running working machine."

The charging station 3 is an apparatus which charges a battery 17 (FIG. 2) which the robot lawn mower 2 includes through wireless power feeding and is installed in the lawn-mowing area AR. The charging station 3 is also a waiting place for the robot lawn mower 2 not at work. The robot lawn mower 2 is configured to return to the charging station 3 through autonomous running and be charged by the charging station 3, when lawn-mowing work is over or if remaining power of the battery 17 becomes low (the remaining power falls below a predetermined value).

Figure 2:
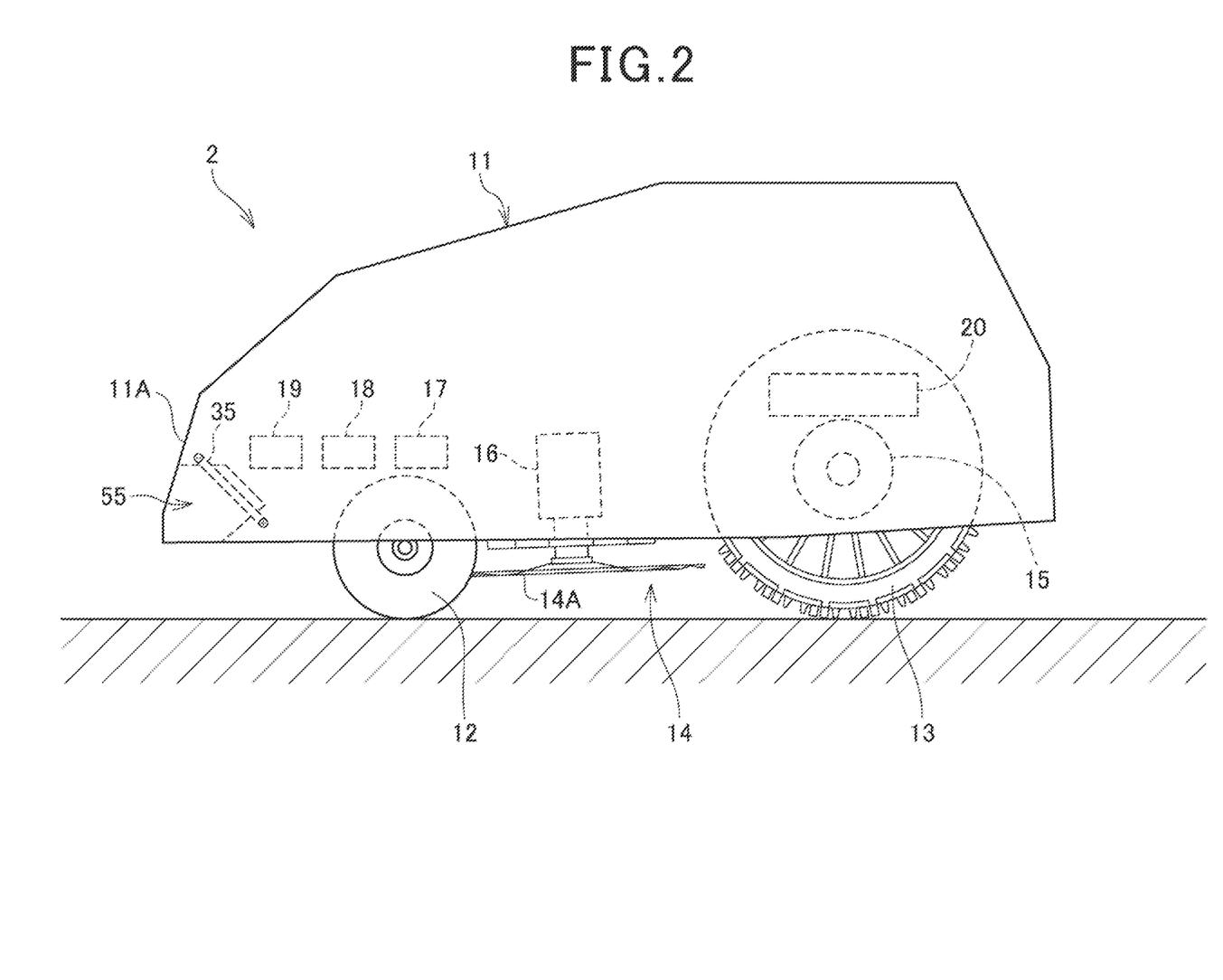
FIG. 2 is a view showing a configuration of a robot lawn mower.

FIG. 2 is a view showing a configuration of the robot lawn mower 2.

The robot lawn mower 2 includes a housing 11 which constitutes a body case, front wheels 12 which are provided on left and right sides of a front portion of the housing 11, rear wheels 13 which are provided on left and right sides of a rear portion of the housing 11, and a working portion 14 which is provided at a lower portion at a center of the housing 11. The working portion 14 has a cutting blade disc 14A which is provided with a cutting blade for mowing turf glass.

The robot lawn mower 2 includes a running motor 15 which individually drives the left and right rear wheels 13, a working-portion driving motor 16 which drives the cutting blade disc 14A of the working portion 14, the battery 17, a charging control circuit 18, and a control portion 20, and the portions are housed in the housing 11.

The control portion 20 controls the portions of the robot lawn mower 2 and has a processor, such as a CPU or an MPU, and a memory device, such as RAM or ROM. With execution of a program stored in the memory device by the processor, the control portion 20 functions as means for various types of control, such as autonomous running control that controls the running motor 15 for autonomous running and lawn-mowing operation control that controls the working-portion driving motor 16 for lawn-mowing operation. The memory device also stores various types of data required for autonomous running control and lawn-mowing work control, such as map data related to the lawn-mowing area AR and schedule data indicating an automatic execution schedule for lawn-mowing work.

The battery 17 feeds power to the portions of the robot lawn mower 2, and the charging control circuit 18 charges the battery 17 with power fed from the charging station 3.

In the present embodiment, the charging station 3 and the robot lawn mower 2 constitute a wireless power feeding system 30 which wirelessly feeds power from the charging station 3 to the robot lawn mower 2. According to the wireless power feeding system 30, since an electrode which mechanically engages with the charging station 3 for power reception need not be provided in the robot lawn mower 2, watertightness, dust-proofness, and insulation of the robot lawn mower 2 can be improved. In the robot lawn mower 2, an electrode (a power reception coil 35 (to be described later)) for power reception is arranged in the housing 11 to prevent the electrode from being exposed, which achieves improvement in the safety, durability, and design of the robot lawn mower 2.

The above-described wireless power feeding system 30 will be described in more detail with reference to FIG. 3.

Figure 3:
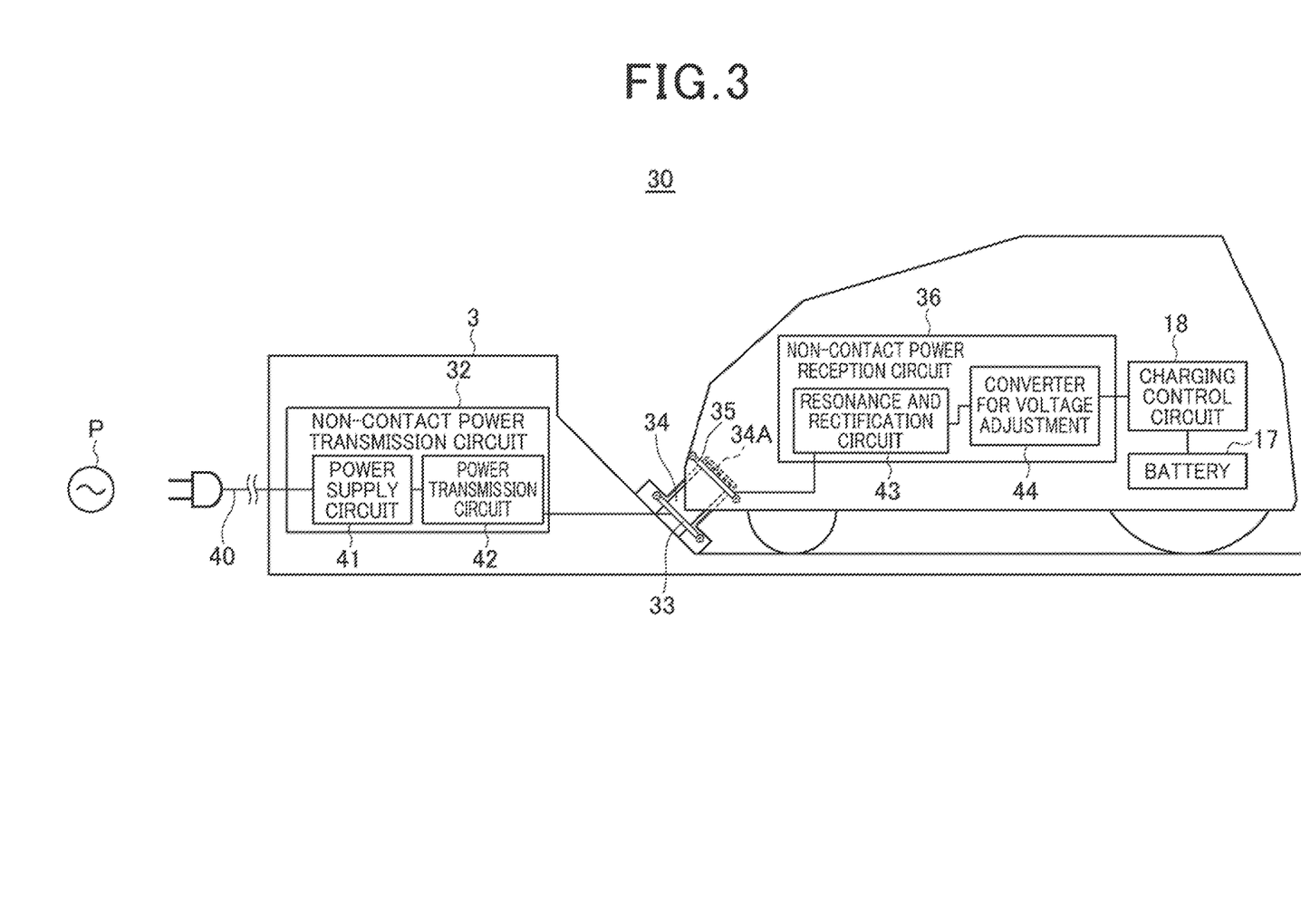
FIG. 3 is a diagram showing a configuration of a wireless power feeding system.

FIG. 3 is a diagram showing a configuration of the wireless power feeding system 30.

The wireless power feeding system 30 is a system which transmits and receives power in a non-contact manner using electromagnetic induction. As shown in FIG. 3, the charging station 3 includes a non-contact power transmission circuit 32, a power transmission coil 33, and a core 34, and the robot lawn mower 2 includes the power reception coil 35 and a non-contact power reception circuit 36.

The non-contact power transmission circuit 32 is a circuit which is connected to a commercial power supply P via a power supply cord 40 and transmits commercial power of the commercial power supply P through the power transmission coil 33 and includes a power supply circuit 41 which converts the commercial power into transmitted power and a power transmission circuit 42 which outputs an AC voltage (AC current) of a predetermined frequency corresponding to the transmitted power to the power transmission coil 33. The power transmission coil 33 is a coil for power feeding. The core 34 is a columnar member made of a magnetic material, and the power transmission coil 33 is provided in a state of being inserted in the core 34.

The power reception coil 35 is a coil for power extraction and receives power from the power transmission coil 33 by being magnetically coupled to the power transmission coil 33 that generates an alternating magnetic field with the AC current and generating induced electromotive force through electromagnetic induction.

In the wireless power feeding system 30 according to the present embodiment, wireless power feeding is performed with a leading end 34A of the core 34 inserted in the power reception coil 35 at the time of charging of the battery 17, which strengthens magnetic coupling between the power transmission coil 33 and the power reception coil 35 and enhances the efficiency of energy transfer between the power transmission coil 33 and the power reception coil 35.

The non-contact power reception circuit 36 generates charging power from the induced electromotive force generated in the power reception coil 35 and includes a resonance and rectification circuit 43 and a converter 44 for voltage adjustment. The resonance and rectification circuit 43 is a circuit which generates a sinusoidal current in the power reception coil 35 by causing the power reception coil 35 to resonate with the alternating magnetic field (AC current) of the power transmission coil 33 and outputs a DC voltage by rectifying the current. The converter 44 for voltage adjustment is a circuit which converts the DC voltage output by the resonance and rectification circuit 43 into a DC voltage having a predetermined voltage value used for charging and outputs the DC voltage. The DC voltage is applied to the battery 17 by the charging control circuit 18 described above, thereby charging the battery 17.

Note that the wireless power feeding system 30 may adopt any materials and any structures (e.g., sizes and shapes) for the power transmission coil 33, the core 34, and the power reception coil 35 as long as desired power can be wirelessly fed.

It is necessary for the electromagnetically guided wireless power feeding system 30 to increase diameters of the power transmission coil 33 and the power reception coil 35 and the size of the core 34 for transmission and reception of power of the same magnitude with an increase in a distance over which energy is transferred in a non-contact manner (i.e., a distance between the power transmission coil 33 and the power reception coil 35). For this reason, the core 34 has a tendency to be relatively large in size and be a heavy load.

To cope with the above-described tendency, as described above, the wireless power feeding system 30 is configured such that the core 34 is provided on a side of the charging station 3 and such that the power reception coil 35 of the robot lawn mower 2 is to be inserted into the core 34. This curbs an increase in the weight of the robot lawn mower 2 and curbs adverse influences, such as impairment in portability (carriageability by a user) of the robot lawn mower 2 and a high likelihood of leaving wheel tracks on a lawn. Additionally, since the core 34 is not provided on a side of the robot lawn mower 2 carried by the user, the relatively fragile core 34 can be inhibited from being broken.

Figure 4:
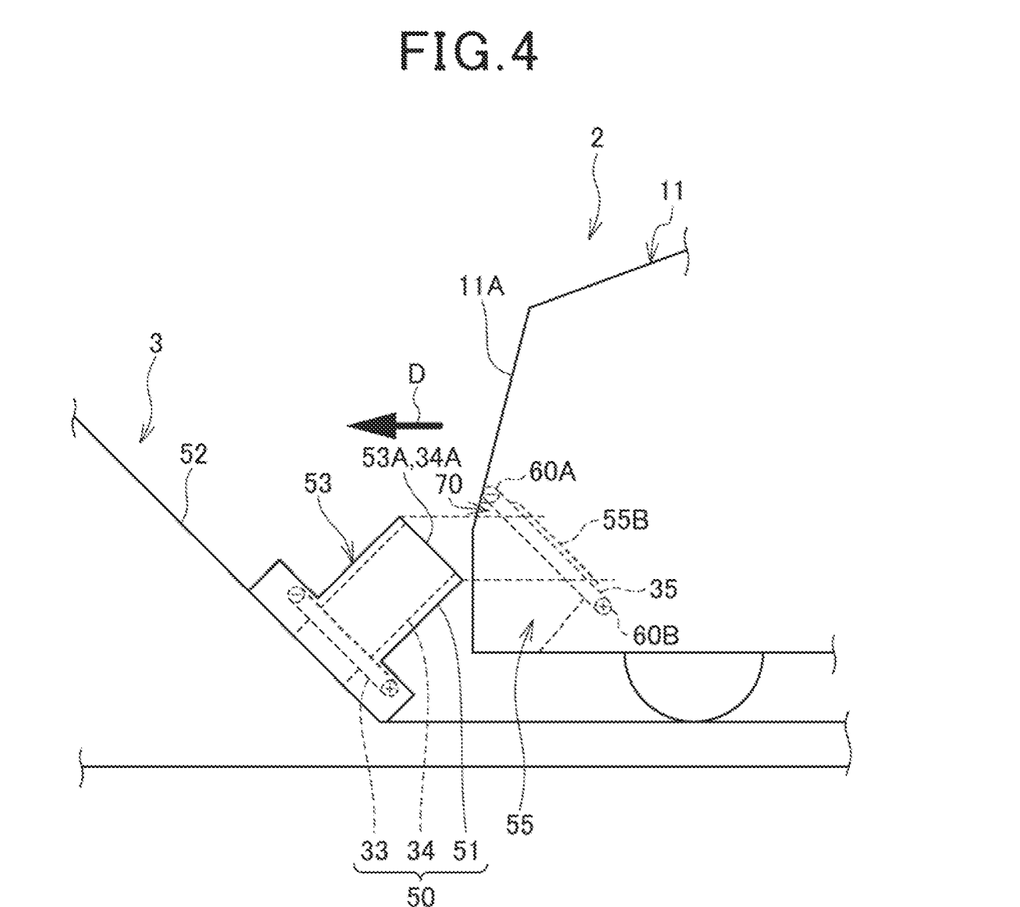
FIG. 4 is an explanatory view of a structure of engagement between a charging station and the robot lawn mower.

FIG. 4 is an explanatory view of a structure of engagement between the charging station 3 and the robot lawn mower 2.

As shown in FIG. 4, the charging station 3 has a structure 50 for power transmission which includes the power transmission coil 33, the core 34, and a power transmission cover 51 which covers the power transmission coil 33 and the core 34.

The charging station 3 has a wall surface 52 which confronts the robot lawn mower 2, and the structure 50 for power transmission is provided on the wall surface 52. More specifically, the columnar core 34 is provided on the wall surface 52 so as to protrude, the power transmission coil 33 is inserted into the core 34, and the core 34 and the power transmission coil 33 are covered by the power transmission cover 51. The power transmission cover 51 has a projecting portion 53 in a convex shape (the shape of a rectangular column in the present embodiment), and the core 34 is arranged in the projecting portion 53. Note that any materials may be adopted for the wall surface 52 and the power transmission cover 51 as long as wireless power feeding is not blocked.

Figure 5:
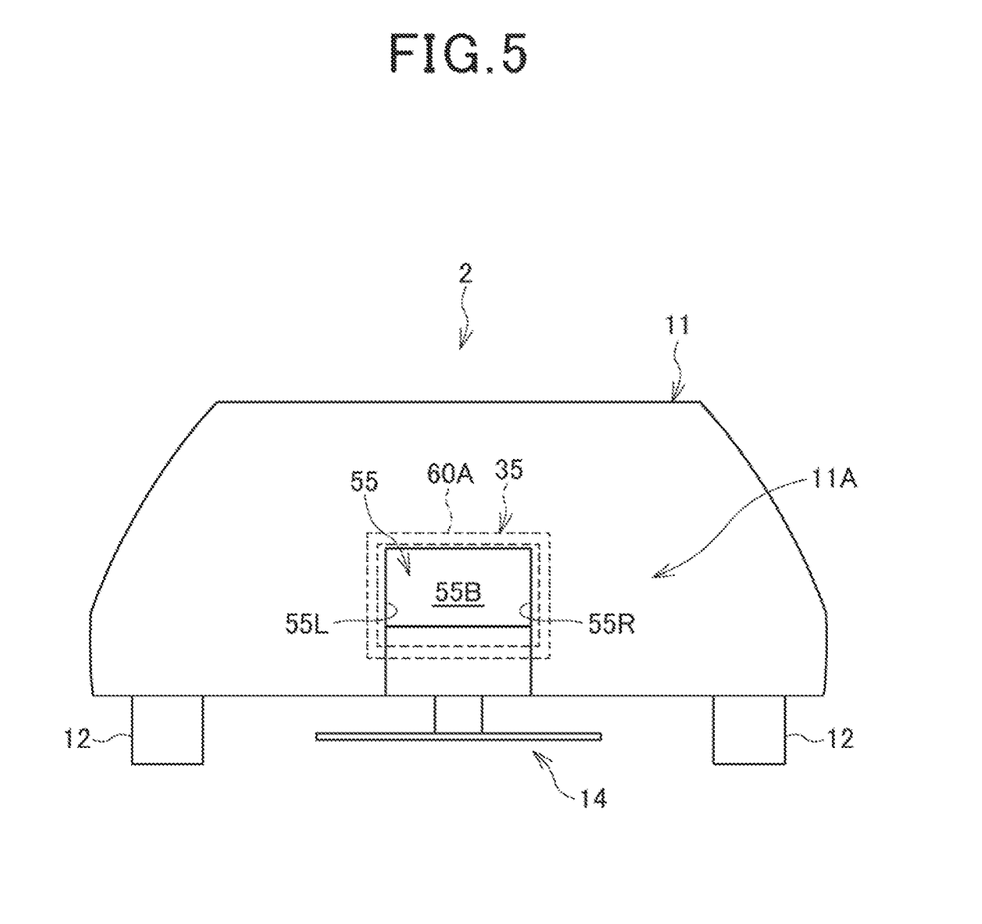
FIG. 5 is a view schematically showing a configuration of a front surface of the robot lawn mower.

FIG. 5 is a view schematically showing a configuration of a front surface 11A of the robot lawn mower 2.

At the front surface 11A of the housing 11 of the robot lawn mower 2, a recessed portion 55 which is to engage with the projecting portion 53 of the power transmission cover 51 is provided on a site which faces the wall surface 52 of the charging station 3 at the time of charging. As shown in FIGS. 5 and 4, the power reception coil 35 is provided in the housing 11 so as to surround the recessed portion 55, and the core 34 in the projecting portion 53 enters a state of being inserted in the power reception coil 35 when the projecting portion 53 of the charging station 3 enters into the recessed portion 55.

Note that any method may be adopted to install the power reception coil 35 in the housing 11 and that the power reception coil 35 may be, for example, buried in the recessed portion 55 of the housing 11 made of resin or held by a holding structure provided at an inner surface of the housing 11.

As shown in FIG. 5, the recessed portion 55 of the present embodiment is configured such that a left side surface 55L on a left side and a right side surface 55R on a right side which engage with the projecting portion 53 in front view of the front surface 11A and a bottom surface 55B which butts against a leading end 53A (FIG. 4) of the projecting portion 53 set a position of the projecting portion 53 of the charging station 3 and the recessed portion 55 of the robot lawn mower 2 relative to each other at a unique position. With the structure of engagement between the projecting portion 53 and the recessed portion 55, the position of the power transmission coil 33 and the power reception coil 35 relative to each other is set at a position where energy is efficiently transferred.

Note that engagement surfaces (e.g., the left side surface 55L and the right side surface 55R) of the projecting portion 53 and the recessed portion 55 may be formed in tapered shapes such that the projecting portion 53 and the recessed portion 55 are likely to engage together when the robot lawn mower 2 returns to the charging station 3.

The robot lawn mower 2 can determine whether the projecting portion 53 and the recessed portion 55 are in appropriate engagement by determining whether a voltage not less than the predetermined value is received by the power reception coil 35 when the robot lawn mower 2 runs autonomously and returns to the charging station 3.

Figure 6A:
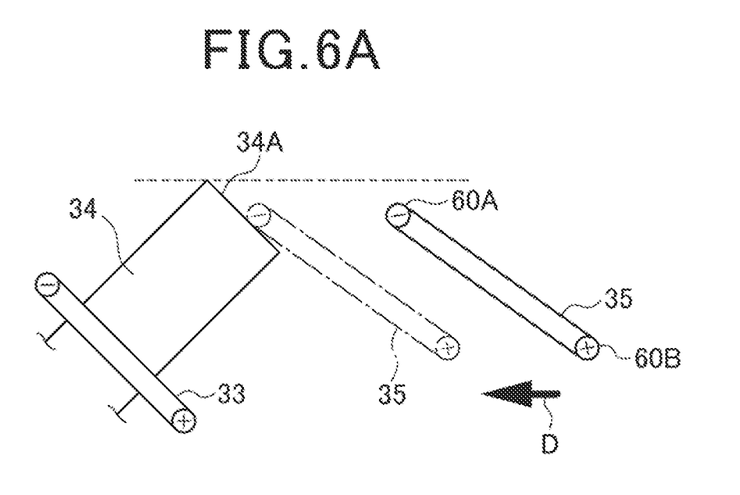
FIGS. 6A and 6B are explanatory views of relationships of engagement among a power transmission coil, a core, and a power reception coil.
Figure 6B:
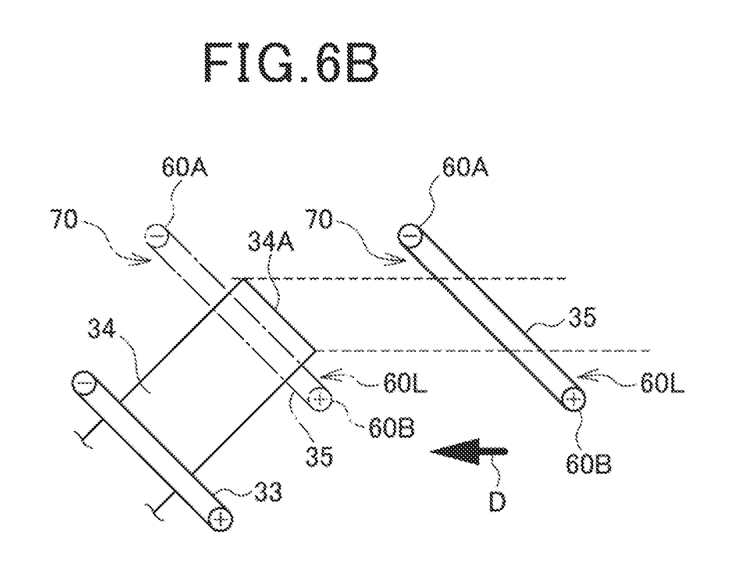

FIGS. 6A and 6B are explanatory views of relationships of engagement among the power transmission coil 33, the core 34, and the power reception coil 35.

In order for the power reception coil 35 of the robot lawn mower 2 to be inserted into the projecting portion 53 (the core 34) of the charging station 3, the power reception coil 35 needs to be arranged at a position lower than the leading end 34A of the core 34, as shown in FIG. 6A.

However, in the configuration in FIG. 6A, when the robot lawn mower 2 goes straight in a direction D of entry and enters the charging station 3, the power reception coil 35 collides with the core 34, as indicated by a phantom line, to block entry of the robot lawn mower 2.

Under the circumstances, in the present embodiment, an open portion 70 which allows the core 34 to pass through when the robot lawn mower 2 enters the charging station 3 is provided in the power reception coil 35.

More specifically, as shown in FIGS. 6B and 4, of the power reception coil 35, a front end portion 60A which faces the core 34 when the robot lawn mower 2 enters the charging station 3 is arranged at a position higher than the leading end 34A of the core 34, which causes the open portion 70 through which the core 34 passes to be formed below the front end portion 60A.

Additionally, the power reception coil 35 has a low-position portion 60L which is arranged at a position lower than the leading end 34A of the core 34, and as a result, the leading end 34A of the core 34 passing through the open portion 70 and entering into the power reception coil 35 protrudes from the power reception coil 35. In the present embodiment, the low-position portion 60L is set at a range, including a rear end portion 60B which is opposed to the front end portion 60A, of the power reception coil 35, and the rear end portion 60B is the lowest in the power reception coil 35. The power reception coil 35 having the open portion 70 and the low-position portion 60L is implemented by using the rear end portion 60B as a pivot point in a state where the rear end portion 60B is arranged at a position lower than the leading end 34A of the core 34 and inclining the power reception coil 35 at an inclination angle which arranges the front end portion 60A at a point higher than the leading end 34A of the core 34.

As shown in FIGS. 3 and 4, in the present embodiment, the core 34 is provided to stand obliquely with respect to the ground (i.e., a direction of travel of the robot lawn mower 2). With this configuration, a height of the leading end 34A of the core 34 can be made lower than in a case where the core 34 is provided to stand vertically.

The above-described embodiment has the effects below.

In the present embodiment, the power reception coil 35 of the robot lawn mower 2 has the open portion 70 through which the core 34 passes when the robot lawn mower 2 enters the charging station 3. This prevents the power reception coil 35 from colliding with the core 34 at the time of entry of the robot lawn mower 2 and allows easy arrangement of the core 34 in the power reception coil 35.

In the present embodiment, as for the power reception coil 35, the front end portion 60A that faces the core 34 when the robot lawn mower 2 enters the charging station 3 is arranged at a position higher than the leading end 34A of the core 34, which causes the open portion 70 to be formed below the front end portion 60A.

This configuration allows easy provision of the open portion 70 in the power reception coil 35.

In the present embodiment, since the power reception coil 35 has the low-position portion 60L arranged at a position lower than the leading end 34A of the core 34, it is possible to easily put the power reception coil 35 in a state of being inserted in the core 34 by causing the leading end 34A of the core 34 to protrude from the power reception coil 35 (the low-position portion 60L).

In the present embodiment, since the low-position portion 60L of the power reception coil 35 is provided within a range including the rear end portion 60B opposed to the front end portion 60A, it is possible to easily implement the power reception coil 35 having the open portion 70 and the low-position portion 60L by, for example, using the rear end portion 60B as the pivot point in a state where the rear end portion 60B is arranged at a position lower than the leading end 34A of the core 34 and inclining the power reception coil 35 at an inclination angle that arranges the front end portion 60A at the point higher than the leading end 34A of the core 34.

In the present embodiment, the power transmission cover 51 that covers the power transmission coil 33 is provided at the charging station 3, and the robot lawn mower 2 has the recessed portion 55 as an engagement portion which engages with the power transmission cover 51 when the robot lawn mower 2 enters the charging station 3.

With the structure of engagement between the power transmission cover 51 and the recessed portion 55, the position of the projecting portion 53 of the charging station 3 and the recessed portion 55 of the robot lawn mower 2 relative to each other can be easily set at a position where energy is efficiently transferred.

In the present embodiment, the power reception coil 35 is provided so as to surround the recessed portion 55 that is to engage with the projecting portion 53 of the power transmission cover 51. Engagement of the recessed portion 55 of the robot lawn mower 2 with the projecting portion 53 of the charging station 3 puts the core 34 stored in the projecting portion 53 in a state of being inserted in the power reception coil 35. Thus, for example, when a user sets the robot lawn mower 2 at the charging station 3, even if the power reception coil 35 or the core 34 is invisible, the power reception coil 35 can be easily and reliably inserted into the core 34 just by engaging the projecting portion 53 and the recessed portion 55 together.

Note that the above-described embodiment is merely illustrative of one aspect of the present invention and can be arbitrarily modified or applied without departing from the spirit of the present invention.

Figure 7A:
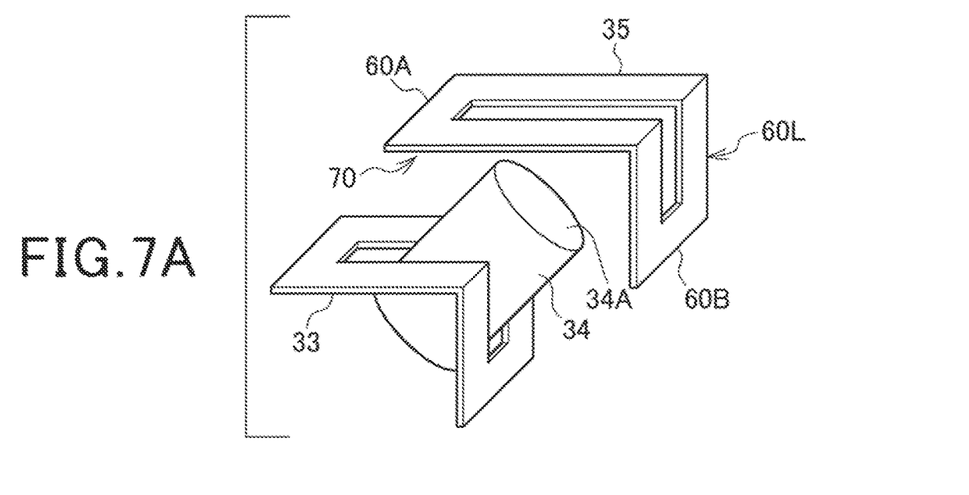
FIGS. 7A, 7B, and 7C are views showing modifications of the power transmission coil, the core, and the power reception coil.

In the embodiment, for example, the open portion 70 may be provided below the front end portion 60A by bending the rear end portion 60B side in a generally L-shape in a state where the front end portion 60A of the power reception coil 35 is arranged at a position higher than the leading end 34A of the core 34, and the low-position portion 60L may be provided on the rear end portion 60B side, as shown in FIG. 7A. In this case, the power transmission coil 33 may be bent in an L-shape so as to follow curvature of the power reception coil 35.

Figure 7B:
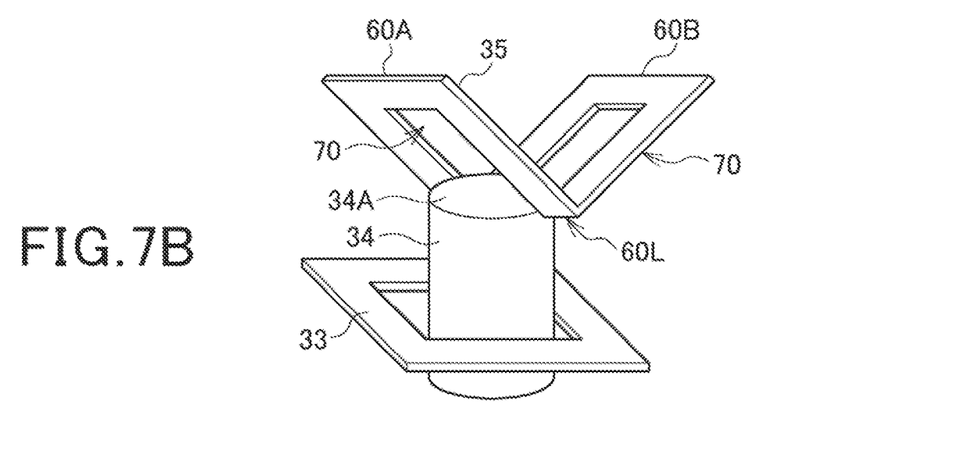

For example, the core 34 is not limited to a configuration in which the core 34 is provided obliquely on the ground and may be provided to stand generally vertically to the ground, as shown in FIG. 7B.

As shown in FIG. 7B, in the power reception coil 35, the low-position portion 60L may be provided between the front end portion 60A and the rear end portion 60B (at an intermediate portion in the illustrated example) in a state where the front end portion 60A and the rear end portion 60B are arranged at positions higher than the leading end 34A of the core 34. According to this configuration, the open portion 70 through which the core 34 can pass can also be formed below the rear end portion 60B.

Figure 7C:
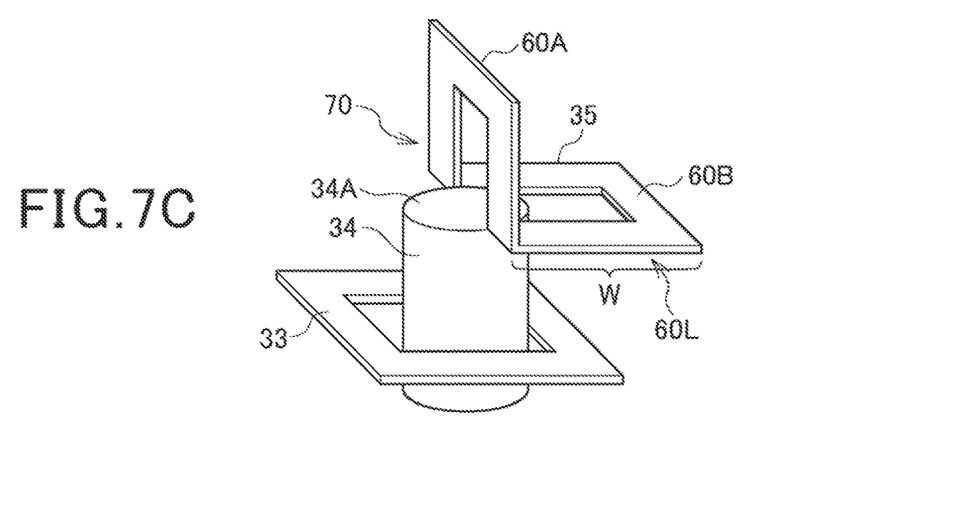

For example, in the power reception coil 35, a predetermined range W extending from the rear end portion 60B toward the front end portion 60A may be set as the low-position portion 60L in a state where the front end portion 60A is arranged at a position higher than the leading end 34A of the core 34, as shown in FIG. 7C.

Figure 8A:
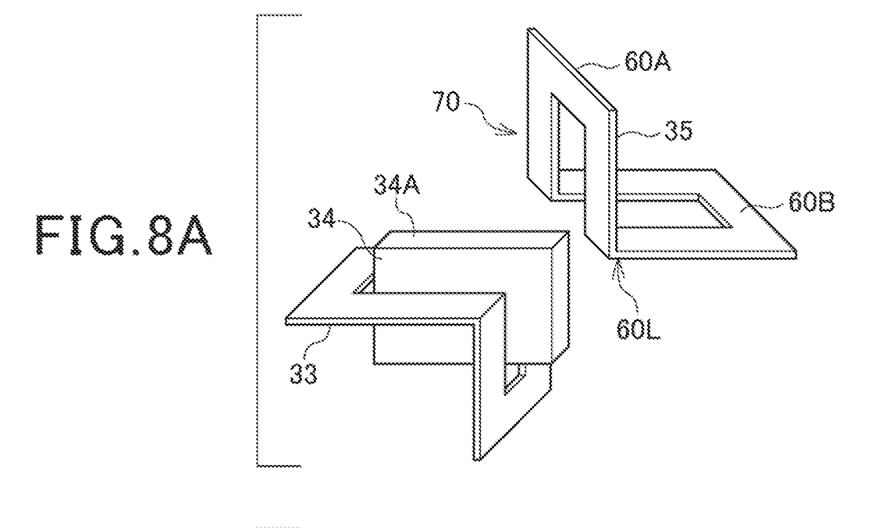
FIGS. 8A and 8B are views showing modifications of the power transmission coil, the core, and the power reception coil.

For example, the core 34 is not limited to the shape of a column, such as a circular column or a rectangular column, and may have, for example, a plate shape, as shown in FIG. 8A. In this case, the leading end 34A of the core 34 corresponds to a surface or a part (an upper surface in the illustrated example) at the highest position.

Figure 8B:
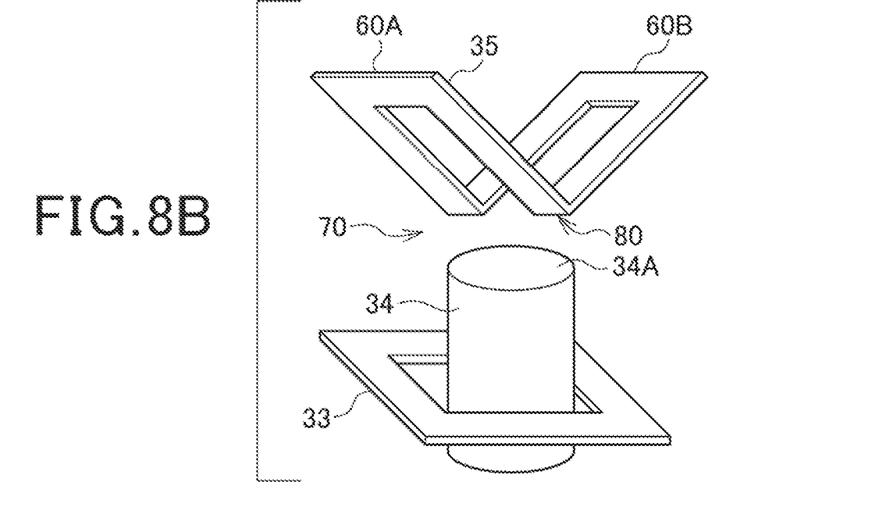

For example, the core 34 may not be inserted in the power reception coil 35 at the time of charging, and a whole of the power reception coil 35, for example, may be arranged at a position higher than the leading end 34A of the core 34, as shown in FIG. 8B. Note that, in this case, in the power reception coil 35, a part 80 close to the leading end 34A of the core 34 is desirably provided at any site (an intermediate portion between the front end portion 60A and the rear end portion 60B in the illustrated example) except the front end portion 60A in order to strengthen magnetic coupling to the power transmission coil 33, as shown in FIG. 8B.

In the embodiment, the battery 17 that the robot lawn mower 2 includes and the power reception coil 35 may be stored in one package such that a user can freely replace the package. Since the package does not include the core 34 that is a heavy load, ease of handling of the package can be enhanced.

The present invention is not limited to the robot lawn mower 2 and can be applied to an arbitrary autonomous running working machine which is equipped with the battery 17 and performs work while running autonomously.

In the embodiment, directions, such as horizontal and vertical, and shapes do not exclude ranges surrounding the directions and approximate shapes unless otherwise noted, and include the surrounding ranges and the approximate shapes (so-called equivalents) as long as the same effects are achieved.

REFERENCE SIGNS LIST 1 unmanned lawn-mowing system
2 robot lawn mower (autonomous running working machine)
3 charging station (station)
17 battery
30 wireless power feeding system
32 non-contact power transmission circuit
33 power transmission coil
34 core
34A leading end of core
35 power reception coil
36 non-contact power reception circuit
50 structure for power transmission
51 power transmission cover
53 projecting portion
53A leading end of projecting portion
55 recessed portion
60A front end portion of power reception coil
60B rear end portion of power reception coil
60L low-position portion
70 open portion
D direction of entry

What is claimed is:

1. A wireless power feeding structure, comprising:
a charging station, and
an autonomous running working machine that receives power wirelessly fed from the charging station,
wherein the autonomous running working machine includes a running motor, a working-portion driving motor, and a working portion that is driven by the working-portion driving motor, the working portion is provided at a lower portion of a housing of the autonomous running working machine and is exposed to an outside of the housing,
wherein the charging station includes a power transmission coil into which a core of a magnetic substance is inserted,
the core is provided on a wall surface so as to protrude from the wall surface, wherein the wall surface confronts the autonomous running working machine when the autonomous running working machine enters the charging station,
wherein, at a front surface of the housing of the autonomous running working machine, a recessed portion is provided on a site that faces the wall surface of the charging station at a time of charging,
the autonomous running working machine includes a power reception coil that is provided in the housing so as to surround the recessed portion and that is magnetically coupled to the power transmission coil,
the power reception coil includes an open portion through which the core passes and into which the core enters when the autonomous running working machine enters the station, and
the power reception coil has a front end portion that positions a front side of the power reception coil when the autonomous running working machine enters the station, the front end portion being arranged at a position higher than a leading end of the core, wherein a rear end portion side of the power reception coil, which is a side opposite to the front end portion, is formed in a L-shape, and the open portion is provided below the front end portion.

2. The wireless power feeding structure according to claim 1, wherein
the power reception coil includes a low-position portion that is arranged at a position lower than the leading end of the core.

3. The wireless power feeding structure according to claim 2, wherein
the low-position portion is provided within a range including a rear end portion that is opposed to the front end portion or between the rear end portion and the front end portion.

4. The wireless power feeding structure according to claim 1, wherein
a power transmission cover that covers the power transmission coil is provided in the station, and
the autonomous running working machine includes an engagement portion that engages with the power transmission cover when the autonomous running working machine enters the station.

5. The wireless power feeding structure according to claim 4, wherein
the power transmission cover includes a convex projecting portion that stores the core,
the engagement portion includes a recessed portion that engages with the projecting portion, and
the power reception coil is provided so as to surround the recessed portion.

* * * * *